US012808714B2

(12) United States Patent
Migunov et al.

(10) Patent No.: US 12,808,714 B2
(45) Date of Patent: Nov. 24, 2026

(54) METHOD FOR NON-INVASIVE MEASUREMENT OF PHYSICAL PARAMETERS OF FLUIDS IN PROCESS PIPES

(71) Applicant: ABB Schweiz AG, Baden (CH)

(72) Inventors: Vadim Migunov, Ladenburg (DE); Paul Szasz, Plankstadt (DE); Guruprasad Sosale, Munich (DE)

(73) Assignee: ABB Schweiz AG, Baden (CH)

( * ) Notice: Subject to any disclaimer, the term of this patent is extended or adjusted under 35 U.S.C. 154(b) by 287 days.

(21) Appl. No.: 18/609,059

(22) Filed: Mar. 19, 2024

(65) Prior Publication Data

US 2024/0319003 A1 Sep. 26, 2024

(30) Foreign Application Priority Data

Mar. 22, 2023 (EP) .................................... 23163577

(51) Int. Cl.
*G01H 13/00* (2006.01)
*G01H 1/00* (2006.01)

(52) U.S. Cl.
CPC ............... *G01H 13/00* (2013.01); *G01H 1/00* (2013.01)

(58) Field of Classification Search
CPC ................................ G01H 13/00; G01H 1/00
See application file for complete search history.

(56) References Cited

U.S. PATENT DOCUMENTS

| | | | | |
|---|---|---|---|---|
| 6,301,973 | B1 * | 10/2001 | Smith | G01F 1/8436 73/861.357 |
| 6,378,364 | B1 * | 4/2002 | Pelletier | E21B 47/107 73/152.47 |
| 8,166,801 | B2 | 5/2012 | Sinha | |
| 2015/0070000 | A1 * | 3/2015 | Gao | G01N 11/16 324/204 |

FOREIGN PATENT DOCUMENTS

| | | | | |
|---|---|---|---|---|
| EP | 0088362 | A1 * | 9/1983 | G01L 9/0008 |
| EP | 4036552 | A1 | 8/2022 | |

OTHER PUBLICATIONS

European Patent Office, Extended European Search Report in European Patent Application No. 23163577.2, 6 pp. (Sep. 27, 2023).

* cited by examiner

*Primary Examiner* — Jamel E Williams
(74) *Attorney, Agent, or Firm* — Fitch Even Tabin & Flannery LLP

(57) ABSTRACT

A system and method for non-invasive measurement of physical parameters of fluids in process pipes includes exciting the process pipe, measuring a vibration signal, and reducing the frequency range of the measured vibration signal to a range where a predicted resonant frequency is located. The method further comprises estimating the number of parameters and values for the parameters for a fitting algorithm, fitting the fitting algorithm to the processed measured vibration signal, and adapting the parameters so that the curve of the fitting algorithm fits to a curve of the processed measured vibration signal. The physical parameter is determined from the parameters.

12 Claims, 1 Drawing Sheet

METHOD FOR NON-INVASIVE MEASUREMENT OF PHYSICAL PARAMETERS OF FLUIDS IN PROCESS PIPES

CROSS-REFERENCE TO RELATED APPLICATIONS

The instant application claims priority to European Patent Application No. 23163577.2, filed Mar. 20, 2023, which is incorporated herein in its entirety by reference.

FIELD OF THE DISCLOSURE

The present disclosure relates to a method for non-invasive measurement of physical parameters of fluids in process pipes, and to a vibration measurement device for conducting such a measurement method.

BACKGROUND OF THE INVENTION

Density measurement is a valuable measurement in industrial processes, delivering relevant information on product and process quality. Most available density sensing systems are invasive, requiring the insertion of a device with fluid contact into the process, partly even intrusive, needing a member protruding into the flow. This leads to long installation times and need for process interruption at installation, causing high cost in case of retrofit additionally to the already high cost of the devices, e.g. Coriolis or vibrating fork sensors. The openings in the process piping created by insertion of an additional device also involve safety hazards of potential leakage, which are met with additional effort in sealing and safety measures.

For non-invasive measurements mostly nuclear radiation-based densitometers are used, in which the amount of radiation absorbed by a fluid is correlated to the density, using calibration and theoretical models. While this technology provides robust and accurate measurements even under harsh conditions, the radioactive hazards and high cost of using this equipment make it rather unpopular, limiting its use.

EP 4 036 552 A1 describes a measurement system for determining a physical parameter of a pipe-fluid system. The measurement system comprises a pair confining element, which are arranged in a distance to each other on an outer surface of the pipe. The confining elements comprises several fixation elements, which are circumferentially arranged of the confining element. The fixation elements acting on the outer surface of the pipe to restrict a vibrational movement of the pipe. With the two confining elements a separate measurement section is formed having a defined length. The measurement system further comprises an excitation device for inducing an excitation in the region between the confining elements. This excitation thereby is measured by a vibration sensor. Further, also the temperature of the pipe is measured. By these measurement values a density of the fluid in the pipe can be determined.

BRIEF SUMMARY OF THE INVENTION

The present disclosure generally describes systems and methods for non-invasive measurement of physical parameters of fluids in process pipes having an improved precision, and to a device for such a measurement.

A method for non-invasive measurement of physical parameters of fluids in process pipes is proposed, which comprises the steps of exciting the process pipe, measuring a vibration signal and reducing the frequency range of the measured vibration signal to a range where a predicted resonant frequency is located. In next steps of estimating the number of parameters and values for the parameters for a fitting algorithm, fitting the fitting algorithm to the processed measured vibration signal and adapting the parameters so that the curve of the fitting algorithm fits to a curve of the processed measured vibration signal, and determining the physical parameter from the parameters.

With the non-invasive measurement, the fluid in the process pipe is not disturbed. The physical parameters of a fluid concerns values like e.g. the temperature, the density and the pressure of the fluid in the pipe. Further, it is not necessary to provide a hole in the pipe for introducing the measurement equipment, which increases the leakage risk. Preferably, the vibration signal is a ring-down vibration signal. The range for the predicted resonant frequency is a range where the resonant frequency is expected. This can be derived from e.g. previous measurements. By doing so, the frequency range to be investigated can be reduced, so that the calculation efforts can be decreased.

As the fitting algorithm is highly non-linear it is necessary to estimate the number of parameters for the fitting algorithm. This can be done by evaluation of former measurements. The number of parameters thereby depends on the number of modes fitted. The more accurate the numbers of parameters are estimated the more accurate the fitting algorithm can be fitted to the processed vibration signal, and the more accurate the physical parameters can be determined from this algorithm. With the method steps it is therefore possible to reduce the calculation effort and time and increase the precision of the determined physical parameters.

BRIEF DESCRIPTION OF THE SEVERAL VIEWS OF THE DRAWING(S)

DETAILED DESCRIPTION OF THE INVENTION

Figure 1:
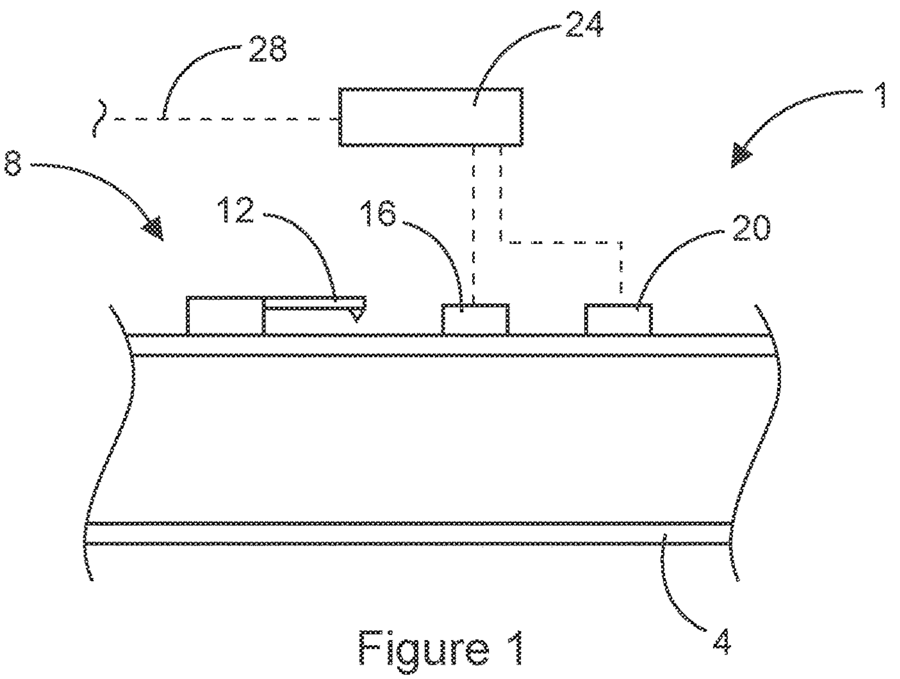
FIG. 1 is a schematic diagram of a vibration measurement device in accordance with the disclosure.

FIG. 1 shows an embodiment of a vibration measurement device 1 according to the present invention. In this figure a process pipe 4 is shown, with a flowing or resting fluid inside this pipe 4. The vibration measurement device 1 comprises an excitation means 8, which in this embodiment is provided as a hammer 12. The excitation means 8 hits the pipe 4, so that the pipe 4 is excited. Thereby a vibration signal is generated by the pipe 4. On the pipe 4 a vibration sensing means 16 is provided with which the vibration signal can be measured. Further, a temperature measuring device 20 is provided on the pipe 4, to measure the temperature of the fluid provided in the pipe 4.

The vibration measurement device 1 further comprises an electronic unit 24. The vibration signal measured by the vibration sensing means 16 and the temperature are provided to the electronic unit 24. Further, also a pressure value 28, which may be determined by a pump is transmitted to the electronic unit 24. From these values the electronic unit 24 determines a density of the fluid in the process pipe 4.

Figure 2:
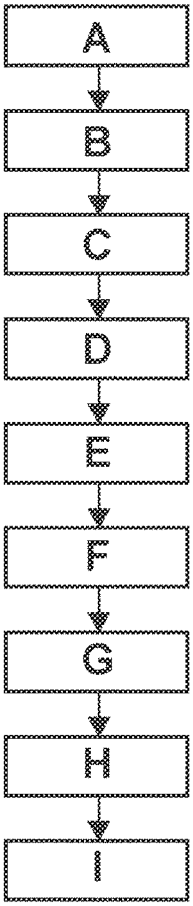
FIG. 2 is a flowchart for a method of non-invasive measurement of physical parameters of fluids in process pipes in accordance with the disclosure.

FIG. 2 shows an embodiment of a method for non-invasive measurement of physical parameters of fluids in process pipes 4 according to the present invention. In a first step A of the method the process pipe 4 is excited by the excitation means 8. In a second step B this generated vibration signal is measured by the vibration sensing means 16. The frequency range of the measured vibration signal in a next step C is reduced to a range where a predicted resonant frequency is located. The resonant frequency thereby is predicted by geometrical parameters of the pipe 4, which do not change during the measurement. Further, as the physical parameter of the fluid merely changes in a specific known range, the resonant frequency range can be estimated in view of this specific range. The frequency range thereby can be significantly reduced. In a further step D, the frequency range also can be reduced by a standard vibration spectrum of the pipe 4, which is measured without excitation of the pipe 4. This vibration spectrum can e.g. be generated by the fluid flowing in the pipe 4.

In a next step E, in the reduced frequency range for the resonant frequency at least one maximum peak is determined. Based on the determined at least one maximum peak a band-pass filtering is applied on the processed measured vibration signal. With this step the frequencies higher and lower of the determined resonant frequency will be removed, so that the frequency range is further reduced. Further, in step F, the duration of the vibration signal is reduced, so that a last part of the vibration signal is cropped. With such a step the calculation time can be reduced. As the vibration signal height with higher duration decreases also the accuracy decreases. By cropping the vibration signal the accuracy can be increased.

In step G, the number of parameters and values for the parameters for a fitting algorithm are estimated. This can be estimated by determining the peaks in a Fourier analysis of the processed vibration signal. In a next step H, the fitting algorithm is fitted to the processed measured vibration signal. Thereby, the parameters are adapted such, that the curve of the fitting algorithm fits best to the curve of the processed measured vibration signal. Finally, in step I, from the parameters of the fitting algorithm and the known physical parameters, the missing physical parameter is determined.

In a preferred embodiment, after the step of reducing the frequency range, in this frequency range at least one maximum peak is determined and a band-pass filtering around this maximum peak is applied on the processed measured vibration signal. The at least one maximum peak thereby corresponds to the peak of the resonant frequency. By determining this at least one peak it is possible to further reduce the vibration signal by means of a band-pass filter, filtering only frequencies in range around the resonant frequency. Thereby, the calculation effort and time further can be reduced. As merely frequencies are investigated around the resonant frequency also the precision of the method can be increased.

In a further embodiment, after the step of reducing the frequency range, the duration of the vibration signal is reduced. The duration of the vibration signal is a time starting from the excitation to a certain time limit. However, as with the duration of the vibration signal the vibration signal decreases, also the influence of other effects, like environmental effects, increases. These effects thereby also decrease the precision of the measurement. It therefore increases the accuracy of the measurement cropping a last part of the vibration signal. By cropping a part of the vibration signal, also the calculation effort and time can be reduced.

Advantageously, the goodness of the fitting is calculated based on goodness parameters. The goodness parameters thereby are a measure of the accuracy of the fitting. By calculating a goodness parameter, it is therefore possible to provide statements on the accuracy of the result. It is therefore possible to repeat the measurement if the goodness is below a given range. Also, false measurements can be easily detected. By providing a goodness parameter the accuracy of the measurement therefore can be increased.

In one embodiment, the goodness is evaluated by calculating that a coefficient of determination is within a given boundary. The fitting result thereby is evaluated by the coefficient of determination. Thereby a value for $R^2$ is determined. The value for $R^2$ preferably should by higher than 0.8. More preferably the value should be higher than 0.95. By calculating such a value a result can be achieved having a high accuracy, so that the physical parameters can be determined with a high precision.

In a further advantageous development, the goodness is evaluated by evaluating, whether a deviation of the resonant frequency to the predicted resonant frequency is greater than a predetermined factor times the frequency resolution. With such a calculation it can be determined whether the resonant frequency is reasonable. Thereby it is prevented that the resonant frequency is determined on an e.g. mismeasurement. Such a mismeasurement would deteriorate the measuring accuracy and the precision of the physical parameter determination. With such a check the accuracy of the measurement can be assured. Preferably, the factor should be two.

In an embodiment, the measured vibration signal is reduced by a standard vibration spectrum, measured without excitation of the pipe. The standard vibration spectrum is a spectrum of vibrations which is usually present. In other words, this vibration spectrum therefore is also present without exciting the pipe. This spectrum may be e.g. generated by the fluid in the pipe, the pump and the geometrical conditions of the pipe. By reducing the vibration signal by this spectrum, the quality of the vibration signal can be improved as the disturbances of the standard vibrations are cancelled.

One embodiment specifies that for the fitting algorithm a harmonic oscillator model is used. As the resonance vibration is most likely similar to a harmonic oscillator this algorithm fits best to the resonance vibration. With such a fitting algorithm a precise fitting of the resonance vibration is possible. Accordingly, the physical parameters can be calculated from the algorithm with a high precision.

The fitting step may use non-linear least square optimization technique. With such an optimization technique the precision of the fitting step can be increased, so that also the precision of the physical parameters can be increased.

Advantageously, the estimation of the number and values of the parameters for the fitting algorithm comprises a Fourier analysis of the measured vibration signal. With the Fourier analysis it is possible to find a respective number of peaks in the reduced frequency range. The number of peaks specify the number of modes of the algorithm. Accordingly, the parameters are chosen with respect to the number of peaks found in the reduced vibration signal. With such an approach the accuracy of the fitting can be increased, as the number of parameters can be good estimated.

According to an embodiment, the resonant frequency is predicted by geometrical parameters of the pipe and the expected physical parameters. As the geometrical parameters of the pipe usually do not change, the influence of the resonant frequency can be expected by e.g. simulations or measurements. Further, the range of the physical parameters is also limited, so that a range of the resonant frequency can be predicted. By these values an easy prediction of the resonant frequency range can be provided.

The problem underlying the present disclosure is also solved by a vibration measurement device for non-invasive determination of physical parameters of fluids in process pipes, adapted to conduct the aforementioned method. The device comprises a vibration excitation means for exciting the pipe, a vibration sensing means for sensing a vibration signal, and an electronic unit, adapted to calculate on the basis of the measuring vibration signal, predicted values of a resonant frequency and two of the physical values comprising pressure, density or temperature, the remaining physical parameter. With such a vibration measurement device the aforesaid advantages can be achieved.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMBERS

1 vibration measurement device
4 process pipe
8 excitation means
12 hammer
16 vibration sensing means
20 temperature measuring device
24 electronic unit
28 pressure value
A step
B step
C step
D step
E step
F step
G step
H step
I step

What is claimed is:

1. A method for non-invasive measurement of a physical parameter of a fluid in a process pipe with a vibration measurement device, the vibration measurement device including a vibration excitation device, a vibration sensor, and an electronic unit, the method comprising:

exciting the process pipe with the vibration excitation device;

measuring a vibration signal of the process pipe with the vibration sensor;

reducing, by the electronic unit, a frequency range of the measured vibration signal to a range where a predicted resonant frequency is located to produce a processed measured vibration signal;

estimating, by the electronic unit, a number of parameters and values for the parameters for a fitting algorithm;

fitting, by the electronic unit, the fitting algorithm to the processed measured vibration signal and adapting the parameters so that the curve of the fitting algorithm fits to a curve of the processed measured vibration signal; and determining the physical parameter of the fluid in the process pipe from the adapted parameters of the fitting algorithm.

2. The method according to claim 1, wherein after reducing the frequency range, determining at least one maximum peak in the frequency range, and applying a band-pass filtering around the maximum peak on a processed measured vibration signal.

3. The method according to claim 1, wherein after reducing the frequency range, reducing a duration of the vibration signal.

4. The method according claim 1, wherein a goodness of the fitting is calculated based on goodness parameters.

5. The method according to claim 4, wherein the goodness is evaluated by determining whether a coefficient of determination is within a given boundary.

6. The method according to claim 4, wherein the goodness is evaluated by evaluating whether a deviation of the resonant frequency to the predicted resonant frequency is greater than a predetermined factor times the frequency resolution.

7. The method according to claim 1, wherein the measured vibration signal is reduced by a standard vibration spectrum that is measured without excitation of the pipe.

8. The method according to claim 1, wherein the fitting algorithm uses a harmonic oscillator model.

9. The method according to claim 1, wherein fitting uses a non-linear least square optimization technique.

10. The method according to claim 1, wherein the estimation of the number and values of the parameters for the fitting algorithm comprises a Fourier analysis of the measured vibration signal.

11. The method according to claim 1, wherein the resonant frequency is predicted by geometrical parameters of the pipe and the expected physical parameters.

12. A vibration measurement device for non-invasive determination of a physical parameter of a fluid in a process pipe, the vibration measurement device comprising:

a vibration excitation device configured for exciting the process pipe;

a vibration sensing device configured for sensing a vibration signal of the process pipe; and an electronic unit configured to calculate the physical parameter of the fluid in the process pipe based on the measured vibration signal, predicted values of a resonant frequency, and physical values comprising two of pressure, density, and temperature, the physical parameter being the remaining physical value;

wherein the electronic unit is programmed and operates to:

measure the vibration signal with the vibration sensing device;

reduce a frequency range of the measured vibration signal to a range where a predicted resonant frequency is located to produce a processed measured vibration signal;

estimate a number of parameters and values for the parameters for a fitting algorithm;

fit the fitting algorithm to the processed measured vibration signal and adapt the parameters so that the curve of the fitting algorithm fits to a curve of the processed measured vibration signal; and determine the physical parameter of the fluid in the process pipe based on the adapted parameters of the fitting algorithm and the physical values.

* * * * *